(12) United States Patent
Thorland et al.

(10) Patent No.: US 6,310,904 B1
(45) Date of Patent: Oct. 30, 2001

(54) MEASUREMENT METHOD TO FACILITATE PRODUCTION OF SELF-ALIGNING LASER GYROSCOPE BLOCK

(75) Inventors: Rodney H. Thorland, Shoreview; Daniel L. Sittler, Hugo; David W. Carlson, Vadnais Heights, all of MN (US); Gerald R. Altmann, Roberts, WI (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/584,208

(22) Filed: May 31, 2000

(51) Int. Cl.[7] ................. H01S 3/083; H01S 3/08; G01B 9/02
(52) U.S. Cl. ................. 372/94; 372/98; 372/99; 372/107; 356/345; 356/349; 356/350
(58) Field of Search ................. 372/94, 107, 98, 372/99, 108; 356/345, 349, 350

(56) References Cited

U.S. PATENT DOCUMENTS

| | | | |
|---|---|---|---|
| 4,777,639 | * 10/1988 | Whitehouse | 372/107 |
| 4,831,632 | * 5/1989 | Simms | 372/107 |
| 4,861,160 | * 8/1989 | Hammons et al. | 356/138 |
| 4,884,283 | * 11/1989 | Rahn et al. | 372/107 |
| 5,960,025 | 9/1999 | Thorland et al. | 372/107 |

* cited by examiner

Primary Examiner—Frank G. Font
Assistant Examiner—Armando Rodriguez
(74) Attorney, Agent, or Firm—Kris T. Fredrick

(57) ABSTRACT

A method for locating the position for a concave mirror alignment device on a RLG block, comprising the following steps: 1) mount a "log" onto a CNC machine, 2) select several points along the length of the log for measurement; 3) measure the mirror mounting surface radial distances at each of the several points from the "front" of the log; 4) measure the surface radial distances at each of the several points from the "rear" of the log; 5) determine the radius, and ultimately the diameter, of a circle tangent to the mirror mounting sides of the log, for each of the several selected points; 6) determine a "best fit" equation to describe the diameters as a function of position along the log; 7) determine the offset along the x axis for the mirror mounting device of each block within the log.

6 Claims, 4 Drawing Sheets

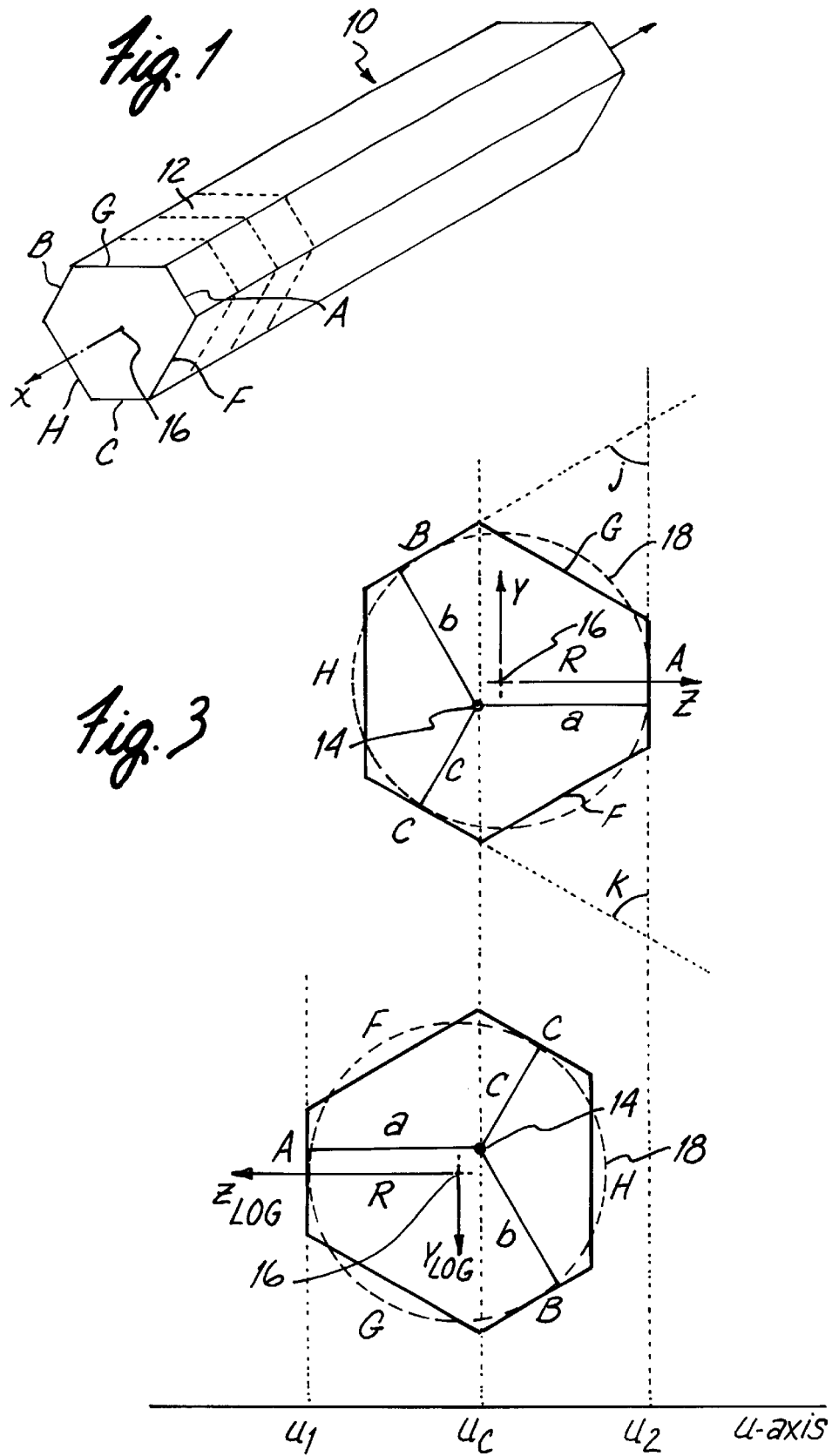

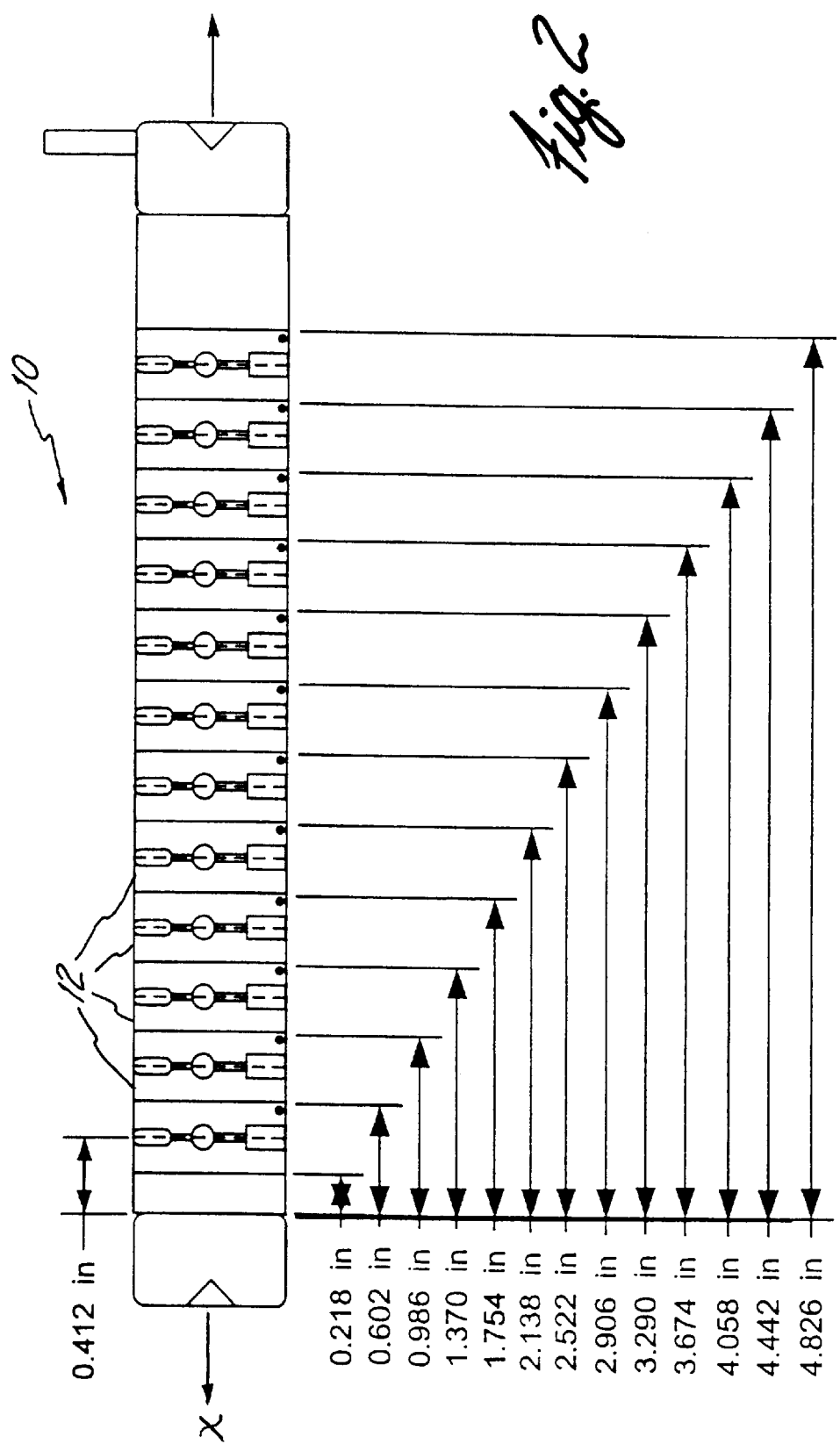

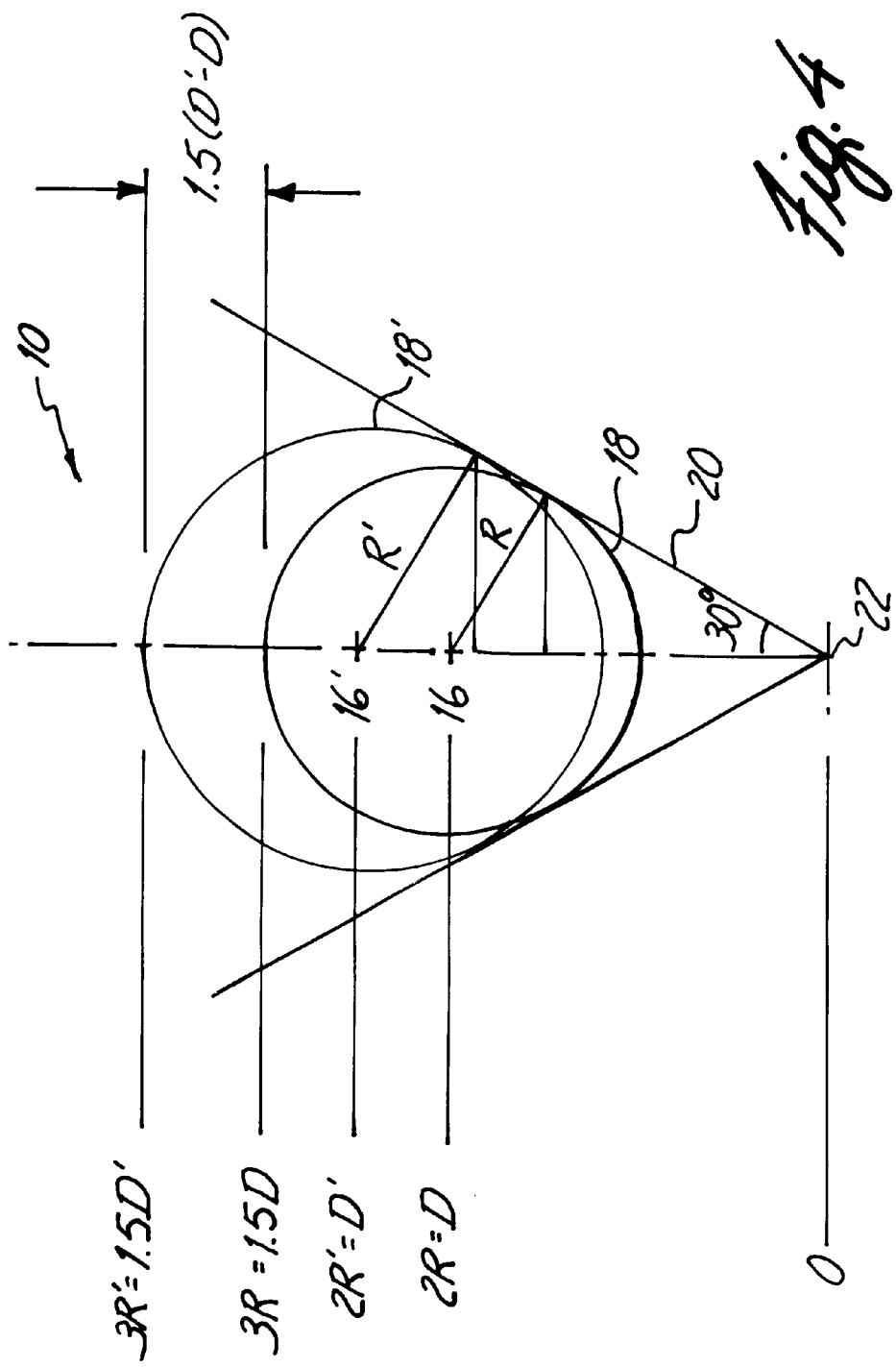

MEASUREMENT METHOD TO FACILITATE PRODUCTION OF SELF-ALIGNING LASER GYROSCOPE BLOCK

CROSS-REFERENCE TO RELATED APPLICATION(S)

None.

BACKGROUND OF THE INVENTION

The present invention is a measurement method to facilitate the production of self-aligning laser gyroscope blocks.

One embodiment of this invention is application to a ring laser gyroscope (RLG). A RLG is commonly used to measure the angular rotation of a vehicle, such as an aircraft. Such a gyroscope has two counter-rotating laser light beams which move within a closed loop path or "ring" with the aid of successive reflections from multiple mirrors. The closed path is defined by an optical cavity which is interior to a structural gyroscope frame or "block". In one type of RLG, the block includes planar top and bottom surfaces that are bordered by six planar sides that form a hexagon-shaped perimeter. Surfaces on each of the sides define mounting areas for components such as mirrors and electrodes. For example, three planar non-adjacent sides of the block form the mirror mounting surfaces for three mirrors at the corners of the optical path, which is triangular in shape.

Operationally, upon rotation of the RLG about its input axis (which is perpendicular to and at the center of the planar top and bottom surfaces of the block), the effective path length of each counter-rotating laser light beam changes, and a frequency differential is produced between the beams that is nominally proportional to angular rate. This differential is then measured by signal processing electronics to determine the angular rotation of the vehicle.

A typical RLG block has three electrodes, which are disposed one on each of three non-adjacent planar side surfaces, and three mirrors, one of which has a concave reflective surface while the other two mirrors have planar reflective surfaces. The curved mirror serves two main purposes. First, the curvature of the reflective surface controls the diameter and the primary mode of the counter-rotating laser light beams. Second, the curvature of the reflective surface is used to align the counter-rotating laser light beams within the optical cavity so that the light beams are at substantially maximum intensity to minimize RLG bias errors. In particular, this latter purpose is accomplished due to the inherent attributes of the concave reflective surface. By nature, the angle of the surface of a concave mirror varies in accordance with its curvature. Therefore, an incident laser light beam can be redirected or "steered" by translating (i.e., moving) the curved mirror within the plane of its respective block mounting surface.

In practice, with the two planar mirrors already mounted on the block, the concave mirror is translated to selectively steer the light beam within the optical cavity via a conventional mirror movement mechanism. During translation of the concave mirror, a detector, such as a photodiode, senses the intensity of the laser light out put from the cavity through one of the planar mirrors that is partially transmissive. The photodiode generates an electrical signal representative of the intensity of the laser light output from the optical cavity. This signal is monitored by a voltmeter during such translations of the concave mirror until a mirror position is found exhibiting a maximum output on the voltmeter. This mirror position indicates that the counter-rotating laser light beams are at substantially maximum intensity and therefore are optimally aligned within the aperture of the optical cavity. The concave mirror is then secured to its mounting surface on the block at the optimum mirror position to complete the laser light beam alignment process.

Though the above described alignment mechanism and process adequately aligns the counter-rotating laser light beams within the optical cavity of the block so as to minimize RLG bias errors, there is at least one disadvantage. The mechanism and process described requires a great deal of handling of the concave mirror, particularly when translating the mirror about its mounting surface to identify the mirror's optimum mirror mounting position. The greater the extent of concave mirror manipulation, the better the chance of introducing contaminants (i.e., dirt) to or damaging the delicate reflective surface of the mirror. Any damage and/or contamination increases the likelihood of bias errors and degrades RLG performance. If the bias errors are too great and/or the RLG performance too corrupted, the RLG must be rebuilt or scraped. This increases the manufacturing cost of producing the RLG's.

There is a need for improved device and method for achieving optical alignment of an optical cavity such as the optical cavity of an RING. In particular, there is a need for a mirror alignment device and method that reduces the amount of mirror handling needed to align the light beams within the optical cavity. In addition, the device and method should reduce the likelihood of mirror reflective surface damage and/or contamination during alignment, to reduce the number of RLG's needing to be rebuilt or scrapped. Moreover, the mirror alignment device and method should be relatively easy and inexpensive to practice and should facilitate automation of assembly.

BRIEF SUMMARY OF THE INVENTION

The present invention is a method for locating the optimal position for a concave mirror alignment device on a RLG block so as to minimize RLG bias errors. A preferred embodiment of method includes the following steps: 1) mount a "log" onto a CNC machine; 2) select several points along the length of the log for measurement; 3) measure the mirror mounting surface radial distances at each of the several points from the "front" of the log; 4) measure the surface radial distances at each of the several points from the "rear" of the log; 5) determine the radius, and ultimately the diameter, of a circle tangent to the mirror mounting sides of the log, for each of the several selected points; 6) determine a "best fit" equation to describe the diameters as a function of position along the log; 7) determine the offset along the x axis for the mirror mounting device of each block within the log.

BRIEF DESCRIPTION OF THE DRAWINGS

FIG. 1 is a perspective view of a RLG log.

FIG. 2 is a plan view of a RLG log, with the measurement points indicated for a preferred embodiment.

FIG. 3 is a diagram illustrating the measurement method of the present invention.

FIG. 4 is a diagram illustrating the difference in elevation of the opposite ends of a log in a V-block measurement.

DETAILED DESCRIPTION

Figure 5:
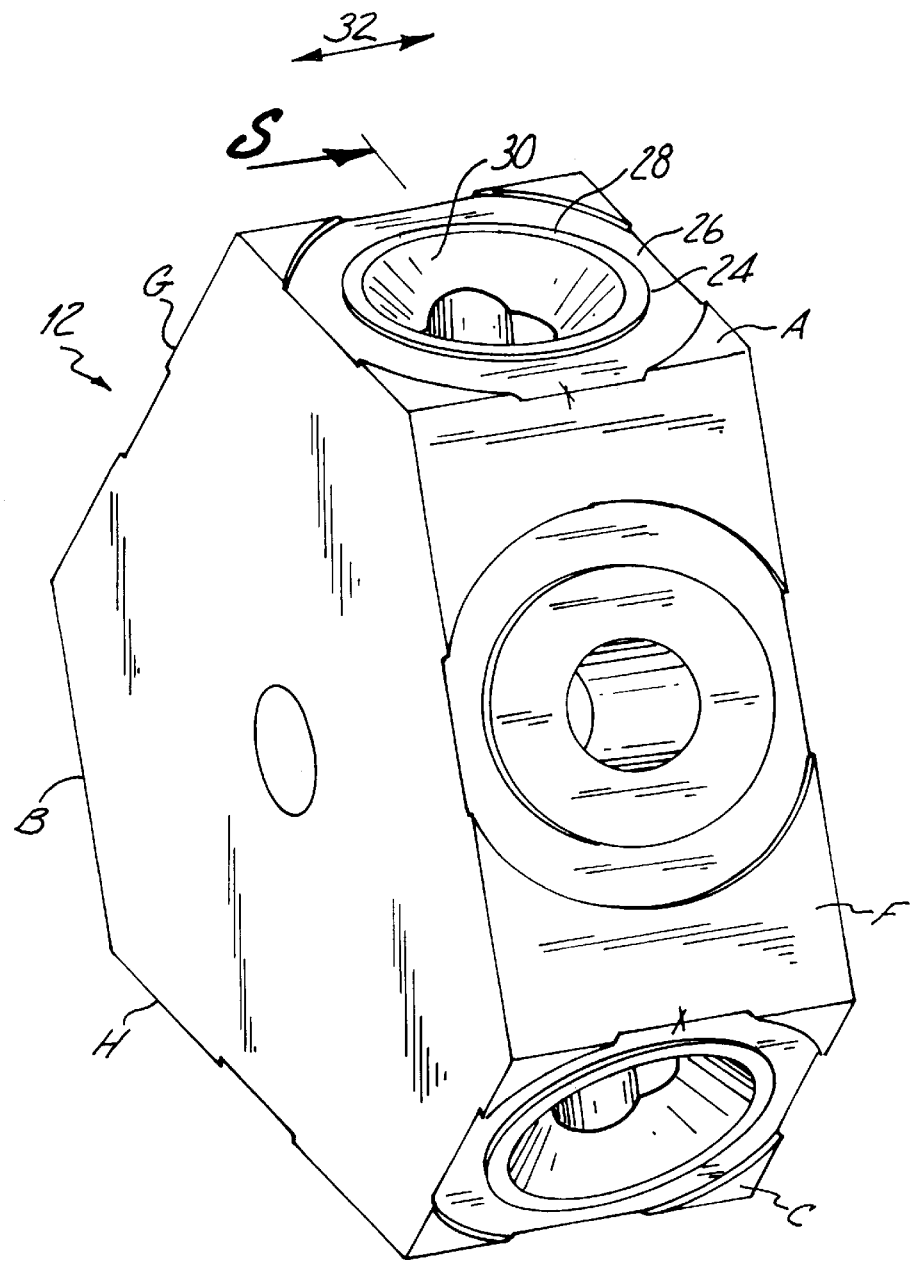
FIG. 5 is a perspective view of a RLG block showing a mirror mounting device.

FIG. 1 shows a ring laser gyroscope (RLG) log 10. Log 10 is formed of a glass, glass ceramic, or like material.

Suitable log materials include the glass ceramic material marketed under the trademarks "Cervit" and "Zerodur". An example of a suitable glass material is a borosilicate glass marketed under the trademark "BK-7".

The cross section of log 10 is generally triangular shaped with a hexagonal outer periphery. The hexagonal outer periphery includes three planar non-adjacent sides that form first, second and third mirror mounting surfaces A, B and C, and three further planar non-adjacent sides F, G and H.

To form individual RLG's, log 10 is drilled, or machined, with various internal passages and bores and then sliced into individual blocks 12. However, before such machining is accomplished, the measurement method of the present invention is employed to determine the optimal location for machining a mirror mounting device for a concave mirror. Such a mirror mounting device is disclosed in U.S. Pat. No. 5,960,025, to Thorland et al., which is fully incorporated herein.

When log 10 is to be machined, it is mounted on supports so that machining operations can be accomplished by a computer-controlled machining device. One such device is known as a CNC (computer numerical control) machine. However, the turning axis of the supports does not usually coincide exactly with the true center of log 10. The method of the present invention accurately positions a concave mirror mounting device despite that discrepancy and compensates for any taper or curvature of the log.

In a preferred embodiment, after log 10 is mounted on the CNC machine, several points along the x axis are selected as measurement points. The more points are selected, the more accurate the resulting offset determinations will be for each block 12. In a preferred embodiment, as shown in FIG. 2, twelve blocks will be cut from each log 10, and 13 points along the x axis of log 10 are selected for measurement.

FIG. 3 is a diagram illustrating a preferred embodiment of the method of the present invention. As can be seen in FIG. 3, the turning axis of the supports 14 does not coincide with the true center 16 of log 10. Center 16 is defined as the center of the circle 18 which is tangent to mirror mounting surfaces A, B and C. Measurement "a" is the distance from axis 14 to side "A." Measurement "b" is the distance from axis 14 to side "B." Measurement "c" is the distance from axis 14 to side "C."

In a preferred embodiment, the coordinate system originates at center 16. The x axis, shown in FIG. 1., runs through center 16 along the length of log 10. The Y & Z axes, shown in FIG. 3, exist in a plane perpendicular to the x axis. The Z axis is perpendicular to side A. The Y axis is parallel to side A and perpendicular to the Z axis. The U axis is defined by the numerical control system of the CNC machine and is independent of the X-Y-Z coordinate system. The relationship between the points on the U axis is as follows: $U_c = (U_1 + U_2)/2$.

For each chosen position along the x axis, surface radial distances a, b and c are measured from the "front" of log 10, as shown in the top portion of FIG. 3. Then, log 10 is rotated 180 degrees. Surface radial distances a, b and c are then measured from the "rear" of log 10, as shown in the bottom portion of FIG. 3. The "front" and "rear" numerical values on the U axis are used to calculate the distances a, b & c. For example, as shown in FIG. 3, $a = (U_2 - U_1)/2$.

Let "j" be the angle formed by the intersection of the planes defined by surfaces A and B. Let "k" be the angle formed by the intersection of the planes defined by sides A and C. Let R be the radius of circle 18. Let (Y, Z) be the coordinates of turning axis 14 relative to center 16. Then, $$R = [a^* \sin k] + [b^* \sin j] + [c^* \sin (j+k)] \sin k + \sin j + \sin (j+k)$$

In the simple case where j=k=60 degrees, the following relations result:

$R = (a+b+c)/3$
$Y = (b-a)/\sqrt{3}$
$Z = (a+b-2c)/3$

R is calculated for each of the points selected along the length of the log (the x axis).

The radius (R) measurements taken above are doubled to find the diameter (D) of circle 18 at each selected point x along the length of the log. The resulting data is then used to determine a best-fit curve to describe the diameters as a function of position along the log. Any numerical analysis method may be used, but in a preferred embodiment, a second-order quadratic equation is used. Taking a derivative of this function, the slope can be determined, which describes the net taper or curvature of the three surfaces A, B & C to which the mirrors will later be mounted.

The quadratic equation of a preferred embodiment takes the following form:

$$D(x) = D_0 + 1.5^*(\alpha x + \beta x^2)$$

FIG. 4 explains how the factor of 1.5 is derived. Log 10 is placed in V-block 20, which has an apex angle 22 of 60 degrees, so that two of the mirror mounting sides A, B, or C rest on the planar surfaces of V-block 20. Circle 18 presents the circle which is tangent to sides A, B, and C at or near one end of log 10. Circle 18' presents the circle which is tangent to sides A, B, and C at or near the opposite end of log 10. The difference in the elevation of the opposite ends of log 10 in V-block 20 indicates the taper of the log, which affects the ultimate offset needed for a mirror mounting device for each block 12 that will be cut from log 10.

Radius R of circle 18 forms one side of a right triangle, where the angle opposite R is 30 degrees. By trigonometric functions, the hypotenuse of the right triangle is 2R. Twice the radius of circle 18, or 2R, equals D, the diameter of circle 18: 2R=D. Similarly, radius R' of circle 18' forms one side of a right triangle, where the angle opposite R' is 30 degrees. By trigonometric functions, the hypotenuse of the right triangle is 2R'. Twice the radius of circle 18', or 2R', equals D', the diameter of circle 18':2R'=D'.

The distance from the top of circle 18 to apex 22 is 3R because it is the distance of hypotenuse 2R plus one radius. By simple multiplication of both sides of the 2R=D equation, 3R=1.5D. Similarly, the distance from the top of circle 18' to apex 22 is 3R' because it is the distance of hypotenuse 2R' plus one radius. By simple multiplication of both sides of the 2R'=D' equation, 3R'=1.5D'. By subtraction, the difference in the elevation of the opposite ends log 10 in V-block 20 is 1.5D'−1.5D=1.5 (D'−D). Thus, the block dimension relating to a V-block measurement of pyramidal angle is 1.5 times the diameter difference.

The α and β values of the quadratic equation are then used to calculate the appropriate offset for the mirror mounting device on a block-by-block basis along the log. The equation for the offset at each point x along the log follows:

$$\text{offset}(x) = -1{,}500^* r^* (\alpha + 2\beta x)$$

where
   offset(x) is in units of mils;
   r is the radius of curvature (in inches) of a concave reflective surface of the curved mirror; in a preferred embodiment, r=9.5 inches;

x is the distance of the selected point from the end of the log (in inches); and −1,500 comes from multiplying 1.5 by −1000. The factor of 1000 converts the units from inches to mils, and the negative sign indicates that the direction of the offset is opposite the direction of the slope of the mirror mounting surface (the mirror is shifted "downhill").

Once the offset for each block is calculated, the mirror mounting device for the concave mirror for that block can be machined into the block at the proper location.

FIG. 5 is a perspective view of a RLG block showing a mirror mounting device. Mirror mounting device 24 is offset along the x axis (either in the positive or negative direction indicated by arrow 32) relative to the centerline S—S of the optical cavity of each block 12. Mirror mounting device 24 comprises recessed moat 26 machined into mirror mounting surface A. Such machining results in ring 28, formed interior to moat 26. The interior edge of ring 28 is defined by well 30 into the interior of block 10. The exterior edge of ring 28 is defined by the interior edge of moat 26. The face surface of ring 28 is co-planar with the surfaces of planar side A. In comparison, the surface of moat 26 is below the surfaces of ring 28 and side A. The exterior edge of ring 28 defines mirror alignment device 24, and it is on this edge that the concave reflective surface of the curved mirror rests. In accordance with the present invention, because of the offset of moat 26, and therefore the offset of mirror mounting edge 24, ring 28 may not be uniform in width along its circumference.

One advantage of the present invention is that it allows the entire process to be accomplished by one machine. Because many CNC machines have precision measurement capabilities, the entire process: measurement, fitting of the quadratic equation, calculation of the offsets, and machining of the log, is achieved under CNC computer control. This scheme avoids issues of confusion over communication of measurement results between different machines or operators.

The process is also capable of positioning the mirror mounting device to compensate for any irregularities in the log, such as linear taper or curvature of the log, or tilt of the critical mirror mounting surfaces. This allows the CNC machine to position the mirror mounting device on a block-by-block basis within the log, thereby increasing the accuracy of machining for each RLG. The invention leads to significant economic savings because fewer parts will need to be rejected because of such irregularities.

Although the present invention has been described with reference to preferred embodiments, workers skilled in the art will recognize that changes may be made in form and detail without departing from the spirit and scope of the invention.

What is claimed is:

1. A method for positioning a mirror mounting device on a ring laser gyroscope structure, the structure comprising a log having a plurality of mirror mounting side surfaces, the method comprising the steps of:
    selecting a plurality of measurement points along the length of a log;
    determining a diameter of a circle tangent to the mirror mounting surfaces of the log at each of the selected points;
    determining a best-fit curve to describe the diameter measurements as a function of position along the length of the log;
    calculating where to position the mirror mounting device relative to a center of an optical cavity of a block of the log, from the best-fit curve; and
    machining the mirror mounting device onto the ring laser gyroscope structure.

2. The method of claim 1 wherein 13 measurement points are selected along the length of the log.

3. The method of claim 1 wherein the log has a three mirror mounting side surfaces and wherein the angle between each pair of consecutive mirror mounting side surfaces is 60 degrees.

4. The method of claim 3 wherein determining the diameter of a circle tangent to the mirror mounting surfaces of the log at a point comprises:
    measuring the radial distance between a turning axis of the log and each mirror mounting surface;
    averaging the radial distances to find the radius of the circle; and
    doubling the radius to find the diameter of the circle.

5. The method of claim 3 wherein the best-fit curve is described by the equation:

$$D(x)=D_0+1.5*(\alpha x+\beta x^2)$$

where $D(x)$ is a diameter of the circle at position x along the log, and $D_0$ is a diameter of the circle at substantially one end of the log.

6. The method of claim 5 wherein the position of the mirror mounting device relative to a center of an optical cavity of a block of the log is described by the equation:

$$\text{offset}(x)=-1,500*r*(\alpha+2\beta x)$$

where offset(x) is the offset distance of the mirror mounting device relative to a center of an optical cavity of a block of the log at position x along the log, in units of mils; and r is the radius of curvature of a concave surface of a mirror, in units of inches.

\* \* \* \* \*